United States Patent [19]
Dean

[11] Patent Number: 5,963,261
[45] Date of Patent: *Oct. 5, 1999

[54] LOW COST SCAN CONVERTER FOR TELEVISION RECEIVER

[75] Inventor: John E. Dean, Putnam Valley, N.Y.

[73] Assignee: Philips Electronics North America Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/641,057

[22] Filed: Apr. 29, 1996

[51] Int. Cl.$^6$ ............................................. H04N 7/01
[52] U.S. Cl. ................................ 348/446; 348/448
[58] Field of Search ....................... 348/446, 448, 348/398, 440, 441, 458; 358/459, 458; H04N 7/01

[56] References Cited

U.S. PATENT DOCUMENTS

| | | | |
|---|---|---|---|
| 4,603,350 | 7/1986 | Arbeiter et al. | 348/448 |
| 4,918,524 | 4/1990 | Ansari et al. | 348/398 |
| 5,307,164 | 4/1994 | Dong II | 348/448 |
| 5,386,237 | 1/1995 | Knee | 348/448 |
| 5,404,169 | 4/1995 | Bae | 348/458 |
| 5,488,421 | 1/1996 | Hwang et al. | 348/448 |
| 5,517,247 | 5/1996 | Correa et al. | 348/448 |
| 5,517,248 | 5/1996 | Isoda | 348/459 |
| 5,610,661 | 3/1997 | Bhatt | 348/446 |
| 5,625,421 | 4/1997 | Faroudja et al. | 348/448 |

*Primary Examiner*—Bryan Tung
*Assistant Examiner*—Gims S. Philippe
*Attorney, Agent, or Firm*—Steven R. Biren

[57] ABSTRACT

A circuit that is easily configured to convert from a progressive scan image, e.g., at a resolution of 1280×720, to an interlaced image scan, e.g., at an interlaced resolution of 1920×1080 (1920×540 per field), or visa-versa. One arrangement of the circuit employs multiplexers so that the two conversion modes share the available hardware. The circuit is only marginally more complex than a circuit that can only do the conversion in one direction. The quality of the progressive-to-interlace conversion is acceptable for high-end interlaced display systems and the quality of the interlace-to-progressive conversion is at least high enough for "mid-range" progressive display systems.

24 Claims, 4 Drawing Sheets

LOW COST SCAN CONVERTER FOR TELEVISION RECEIVER

TECHNICAL FIELD

This invention relates to the field of video-type displays and, in particular, to displays capable of displaying multiple resolutions and multiple scanning formats.

BACKGROUND OF THE INVENTION

A standard currently proposed by the Advanced Television Systems Committee (ATSC) for advanced television (ATV) transmission in the United States supports two resolutions for high definition transmission: 1920×1080 interlace and 1280×720 progressive. Due to technology and cost considerations, it is more than likely that practical receiver implementations will be confined to either an interlace or a progressive format. Therefore, for receivers with interlaced displays, a progressive to interlace conversion must be performed whenever 1280×720 progressive material must be displayed. Likewise, for receivers with progressive displays, an interlace-to-progressive conversion must be done whenever 1920×1080 interlace material must be displayed.

One prior art technique for performing progressive to interlace (P-I) conversion is to sub-sample the image by taking every other line from the progressive frame to generate an interlaced field. However, this technique suffers from the problem that horizontal edges exhibit a high degree of interline flicker. A conventional solution to this problem is to interpolate samples from more than one raster line when generating the output raster. An example of this technique is the so-called "Grand Alliance" Scan Converter, which uses a 6-tap vertical filter and an 8-tap horizontal filter to convert from 1280×720 progressive to 1920×540 (1 field) interlaced as described in "Grand Alliance HDTV Multi-Format Scan Converter," ICCE Conference, Jun. 7–9, 1995 by B. Bhatt et al. This approach achieves a high quality output image while requiring only a minimal amount of hardware, e.g., no field memories are required.

One prior art method for performing interlace-to-progressive (I-P) conversion, which is also known in the art as: a) progressive scan conversion, b) de-interlacing, or c) sequential scan conversion, is to simply repeat each line vertically, thus doubling the number of lines. This technique is simple and inexpensive to implement. However, this technique is not recommended as the maximum vertical resolution for still scenes is only half of what it otherwise could be.

Another prior art method for performing I-P conversion is to interpolate the missing scan lines of a frame by using a vertical finite impulse response (FIR) interpolator within the current field. Conventionally, this method is not used in high performance systems because it suppresses higher spatial frequencies. Nevertheless, many systems that display video in a window of a personal computer satisfactorily employ vertical interpolation for doing so.

A third method for performing I-P conversion, known as field insertion, consists of combining the odd and even lines of two consecutive fields to generate each frame. This approach suffers from the drawback of 1) generating "mouses teeth" artifacts in areas where there is motion and 2) incurs the cost of a required field memory.

The above-described methods for interlace-to-progressive conversion may be described as one-dimensional in nature. High-end converters add a second dimension, the temporal dimension. To this end, in addition to the information within a single field that is being converted, they also process stored information regarding previous fields as part of the conversion process. Implementations of such spatio-temporal filters require field memories, the particular number required depending on the particular implementation.

In one approach to spatio-temporal filtering, known as motion adaptive inter/intra interpolation, a field is converted to a frame by first assuming that all scan lines in the field will be copied to the respective scan line positions of the frame, and then calculating the missing lines by a) interpolating in the current field if motion is detected, so-called intra-field interpolation; b) inserting a pixel from the previous field if no motion is detected, so-called inter-field insertion; or c) a combination of the two based on the degree of motion. Therefore, a motion calculation has to be made for each pixel location of the missing lines. The downside of this approach is that it may produce annoying artifacts if the motion decision is not correct or if it changes too often due to noise. Also, the subjective quality of the resulting image tends to vary proportionally, within limits, to the number of field memories employed.

The most advanced technique known for I-P conversion is to use motion estimation and motion compensation. The difference between motion detection and motion estimation is that detectors attempt to calculate the motion of a pixel based on the amplitude of its temporal variation, while estimators calculate the actual direction and velocity of objects in motion, e.g., using motion vectors. The advantage of motion estimators is that a very intelligent decision can be made regarding the spatio-temporal interpolation direction. However, accurate real-time motion estimation often implies extensive hardware, and thus high cost.

Unfortunately, there is no single low cost arrangement for providing both I-P and P-I conversion that will produce sufficiently high quality results.

SUMMARY OF THE INVENTION

Because of the fact that progressive-to-interlace conversion and interlace-to-progressive conversion are mutually exclusive, i.e., never required at the same time in a single product, a display, including a MultiSync monitor, is limited to either interlace scanning or progressive scanning on a per-frame basis. Consequently, only one conversion or the other need be performed in any one frame. Therefore, I have developed a unified, controllably switchable circuit which is arranged so as to be easily configured to convert from a progressive scan image to an interlaced image and vice versa. For example, the circuit may be configured to convert from a progressive scan image at a resolution of 1280×720 to an interlaced image at a resolution of 1920×1080 (1920× 540 per field) and vice versa.

One embodiment of the invention employs multiplexers so that, advantageously, the two conversion modes share the available hardware. The circuit is only marginally more complex than a circuit that can perform the conversion in only one direction. The quality of the progressive-to-interlace conversion is acceptable for high-end interlaced display systems and the quality of the interlace-to-progressive conversion is at least high enough for "mid-range" progressive display systems. Advantageously, an integrated circuit that included such a circuit architecture could find use in a wide variety of display systems.

Thus, it is an object of the invention is to use a common architecture to perform, as appropriate, based on the format of the current input video frame and the capability of the display, either an interlace-to-progressive or a progressive-to-interlace conversion, such as to be used for an ATV standard digital receiver.

A second object of the invention is to perform interlace-to-progressive conversion from 1920×540 fields to 1280×720 frames using spatial processing only, and realizing acceptable image quality.

A third object of the invention is to minimize processing bandwidth throughout the processing path.

A fourth object of the invention is to minimize the amount of line memory and multipliers required, by inserting into the architecture of the converter two-to-one multiplexers at strategic locations.

A fifth object of the invention is to implement the "nearest neighbor" algorithm of interlace-to-progressive conversion.

DETAILED DESCRIPTION

Figure 1:
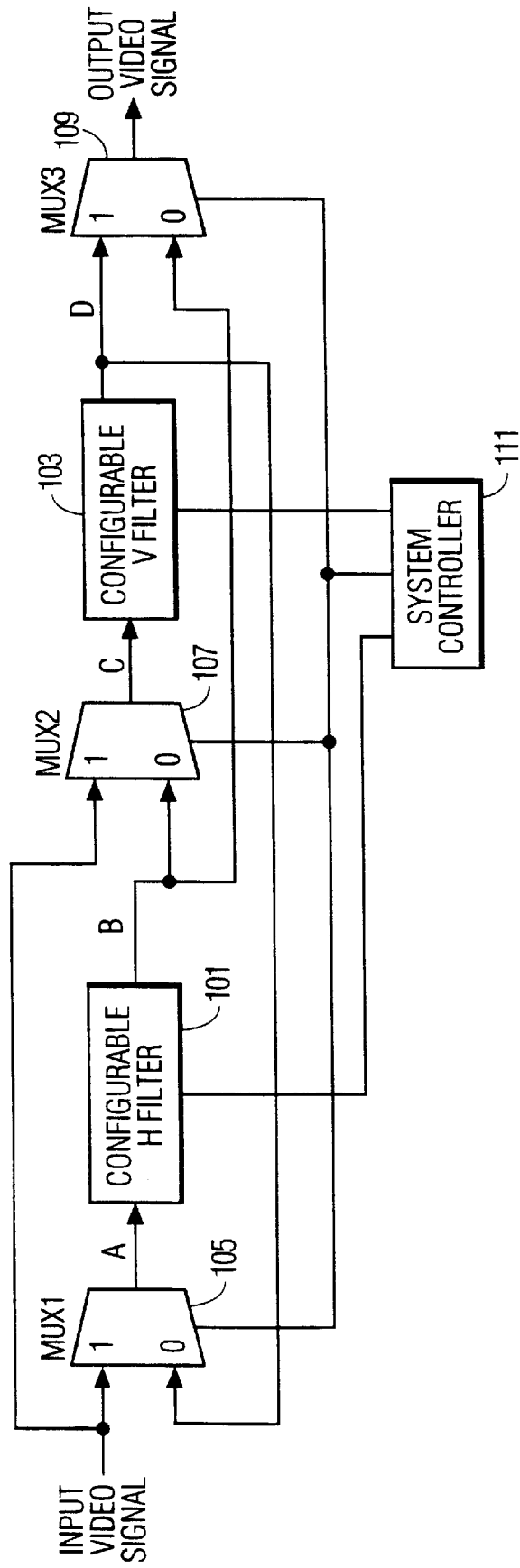
FIG. 1 shows an exemplary embodiment of a unified, controllably switchable I-P and P-I converter, in accordance with the principles of the invention.

FIG. 1 shows an exemplary embodiment of a unified, controllably switchable I-P and P-I converter, in accordance with the principles of the invention. The embodiment of FIG. 1 includes: 1) configurable horizontal filter 101, 2) configurable vertical filter 103, 3) 2-to-1 multiplexers 105, 107 and 109, and 4) system controller 111. System controller 111, e.g., a microprocessor, microcontroller, or a distributed control arrangement, controls the overall operation of the video display system in which the circuit of the invention is employed. Multiplexers 105, 107 and 109 arranged to interconnect configurable horizontal filter 101 and configurable vertical filter 103 to provide an output video signal that is an I-P or P-I converted version of the input video signal depending on whether the "1" input ports or the "0" input ports of multiplexers 105, 107 and 109 are selected. The multiplexing may be implemented using any known method preferred by the implementer, e.g., using logic gates and an inverter or using tri-state buffers and an inverter.

Filters 101 and 103 are each of the finite impulse response (FIR) type, with the ability to download filter coefficients and switch between sets of filters at the pixel processing rate. This ability allows filters 101 and 103 to operate as polyphase filters for sample rate conversion. Further details regarding configurable vertical filter 103 and configurable horizontal filter 105 are described hereinbelow in connection with FIGS. 2 and 3.

Figure 2:
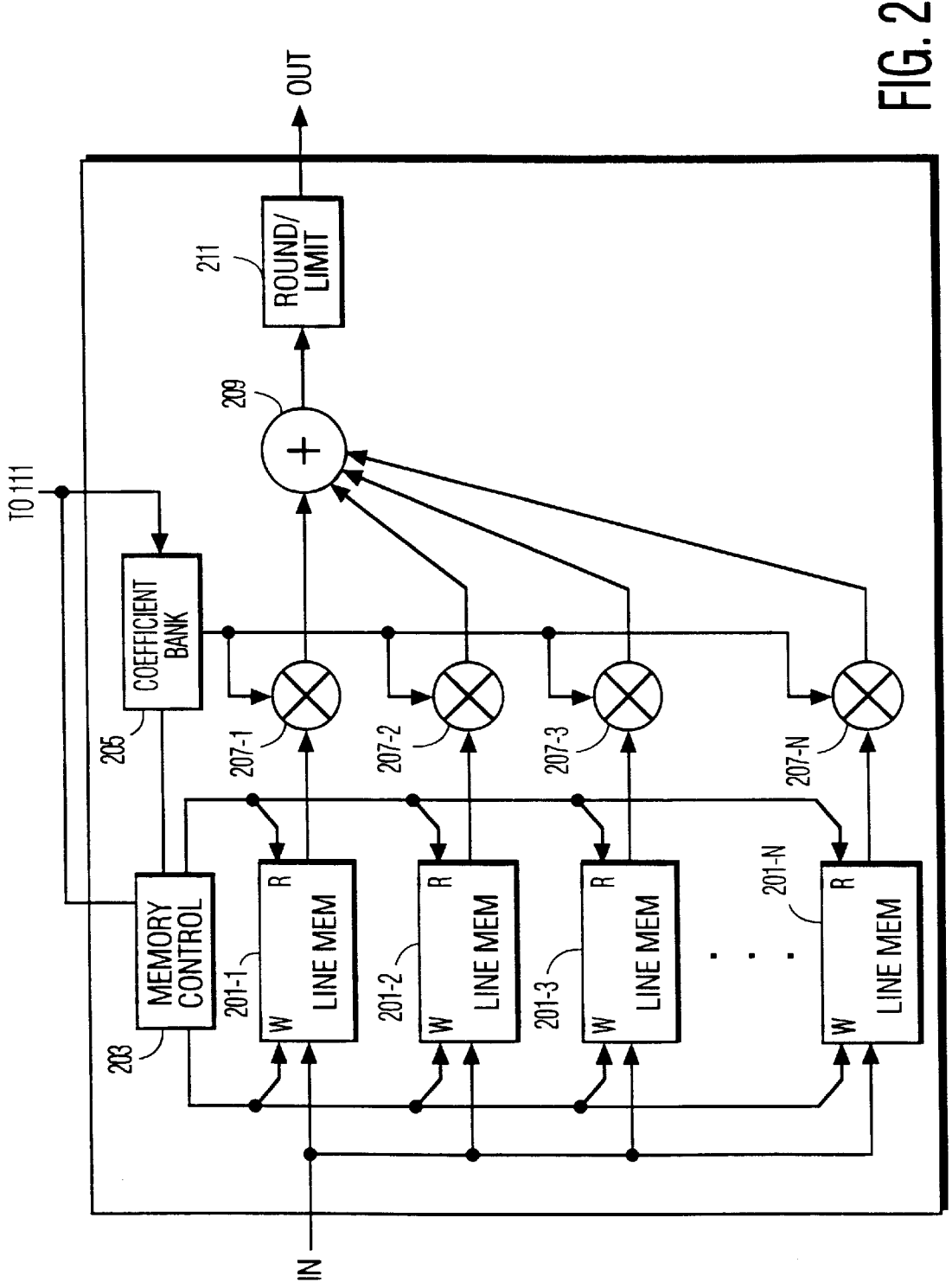
FIG. 2 shows a more detailed view of a configurable vertical filter for use in FIG. 1.

In particular, FIG. 2 shows configurable vertical filter 103, which includes: a) N line memories 201, including line memories 201-1 through 201-N; b) memory controller 203; c) coefficient bank 205; d) N multipliers 207, including multipliers 207-1 through 207-N; e) adder 209 having N inputs; and round/limit circuit 211.

Each of line memories 201 stores the information displayed on one horizontal scan line, in a first-in, first-out, manner. To keep the cost low, in accordance with an aspect of the invention, each of line memories 201-1 through 201-N for luminance processing are limited in length to the smallest number of horizontal pixels that can be displayed. For the above-described ATV example this is 1280 pixels. Such a limit on the length of line memories 201 causes the order in which the interpolation is performed, i.e., vertical then horizontal or horizontal then vertical, to be important. An incorrect ordering would necessitate that line memories 201 have the capacity for storing the number of pixels in a horizontal line of a higher resolution frame, e.g., 1920 pixels.

Specifically, for interlace, e.g., 1920×540, to progressive, e.g., 1280×720, conversion, horizontal interpolation must be performed prior to vertical interpolation. This is achieved by setting each of multiplexers 105, 107, and 109 (FIG. 1) to transmit to their output port the signal supplied to their "1" input port, in accordance with an aspect of the invention. Likewise, for progressive, e.g., 1280×720, to interlace, e.g., 1920×540 conversion, vertical interpolation must be performed prior to horizontal interpolation. This is achieved by setting each of multiplexers 105, 107, and 109 to transmit to their output port the signal supplied to their "0" input port, in accordance with an aspect of the invention. Chrominance processing is discussed hereinbelow.

The writing (W) and reading (R) of line memories 201 (FIG. 2) is regulated by memory controller 203. The writing and reading may be performed simultaneously. Memory control 203 may also control coefficient bank 215. Memory control 203 may be responsive to commands from system controller 111 to determine the type of conversion and filtering to perform.

Coefficient bank 205 stores the filter coefficients for performing either a 540-to-720 conversion (3:4), or vice versa. Coefficient bank 205 stores the coefficients for each of the four phases of configurable vertical filter 205. Since each phase requires N coefficients, coefficient bank 205 typically has the capacity to store 4N coefficients. Optionally, the coefficients may be downloaded from a further remote store, e.g., under the control of system controller 111.

Figure 3:
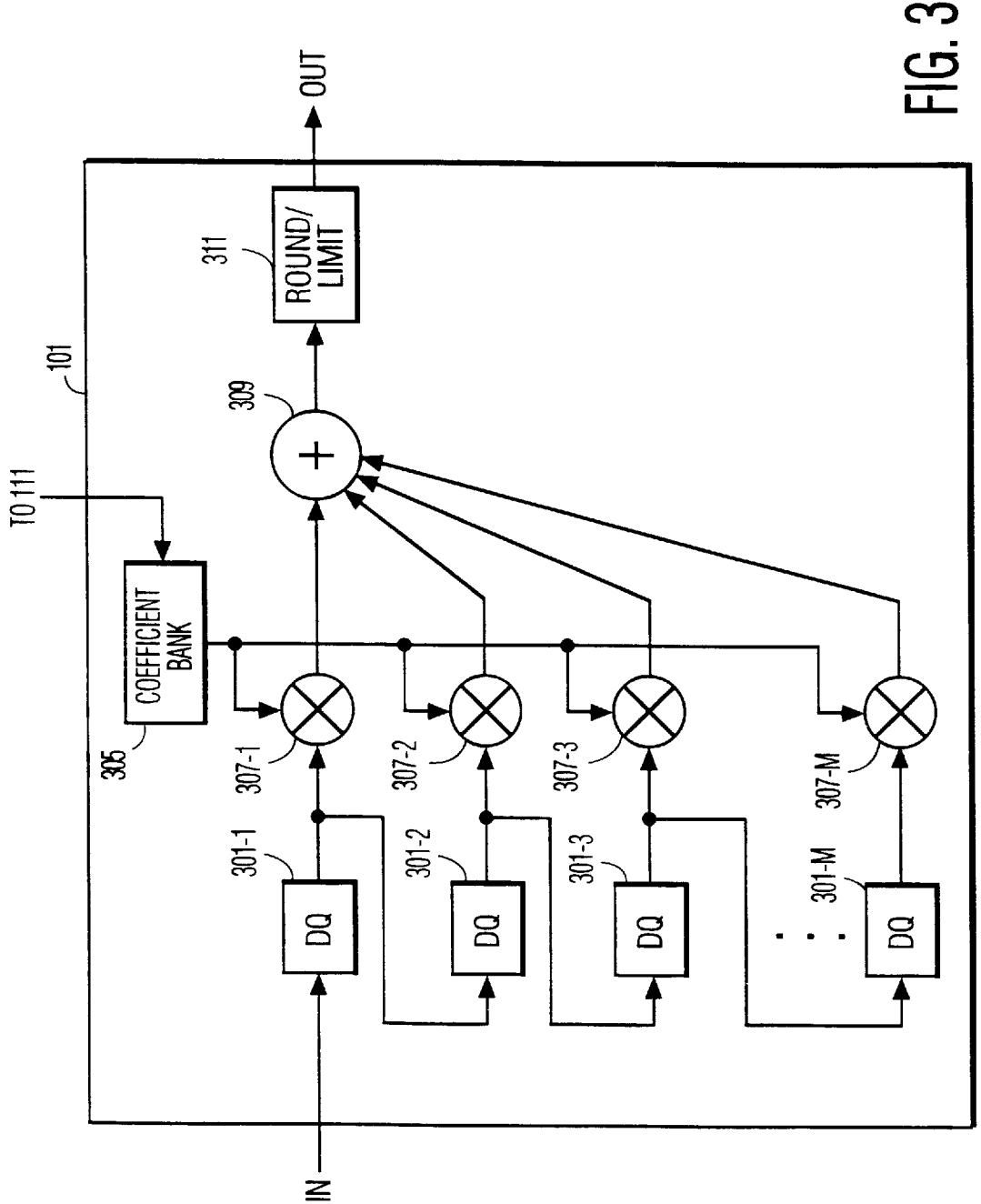
FIG. 3 shows a configurable horizontal filter for use in FIG. 1.

As shown in FIG. 3, configurable horizontal filter 101 is essentially the same as configurable vertical filter 103 except that line memories 201 are replaced by M flip flops 301. Therefore, components numbered alike in FIGS. 2 and 3 except for the series number, are operationally similar.

Figure 4:
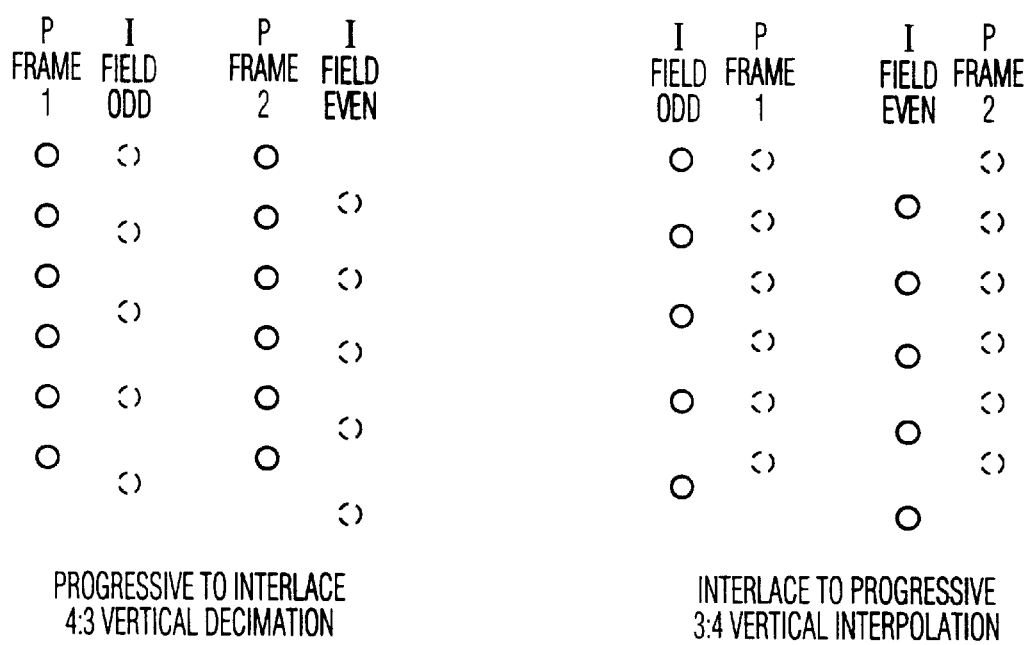
FIG. 4 shows the relative pixel sample positions over the four phases of interpolation for both conversion directions.

FIG. 4 shows the relative pixel sample positions over the four phases of interpolation for both conversion directions. In an embodiment of the invention for use with the ATV example, for M=N=4, each of multipliers 207 and 307 of both horizontal filter 103 and vertical filter 105 are of dimension 8 bits×11 bits and produce 14 significant bits of output. Adders 209 and 309 accept N inputs, in this case 4, of 14 bits each and provide an output of 9 significant bits. In order to achieve a more precise result, rounding and limiting to the range of 0 to 255 is not performed until the very end of the conversion.

Continuing with the ATV example, if vertical filter 105 is designed to have 4 taps (N=4), then coefficient bank 205 must store 32 unique coefficients, i.e., 4 coefficients for each of the 4 phases of a P-I conversion and again an for I-P conversion. Note that vertical filter 105 and horizontal filters 103 are independent. Also note that implementors may tend design horizontal filter 103 with a larger number of taps, i.e., M>N, because horizontal filter 103 does not require expensive line memories.

In addition to its efficient use of hardware, another advantage of the invention is in its efficient utilization of processing bandwidth. This is because the peak processing bandwidth is minimized, which results in a lower power and less expensive implementation than would otherwise be required. For purposes of this application, processing bandwidth is defined as $$BW = H \times V \times F \times B \quad (1)$$

where H and V are the horizontal and vertical resolution in pixels, F is the frame rate in Hz, and B is the number of bytes per pixel. For the ATV example, the processing bandwidth for luminance (LBW) at 1920×1080 interlace is $$LBW = 1920 \times 1080 \times 30 \times 1 = 62.2 \text{ Mbyte/sec.}$$

For 1280×720 progressive, the LBW is $$LBW = 1280 \times 720 \times 60 \times 1 = 55.3 \text{ MByte/sec.}$$

Table 1 shows the LBW for various points in the circuit of FIG. 1. Note that the entire LBW range varies from 41.5 MByte/sec to 62.2 MByte/sec. Therefore the circuit should be designed for a minimum LBW of 62.2 Mbyte/sec.

TABLE 1

| | Luminance Processing Bandwidth (MByte/sec) | |
|---|---|---|
| Signal in FIG. 1 | 1920 × 540 to 1280 × 720 Interlace-to-Progressive | 1280 × 720 to 1920 × 540 Progressive-to-Interlace |
| IN | 62.2 | 55.3 |
| A | 62.2 | 41.5 |
| B | 41.5 | 62.2 |
| C | 41.5 | 55.3 |
| D | 55.3 | 41.5 |
| OUT | 55.3 | 62.2 |

Until now only luminance processing has been discussed. This is because chrominance may be processed in generally the same manner. In particular, with regard to chrominance, in the proposed ATSC standard for ATV the video is coded in a 4:2:0 format, which means the processing bandwidth and memory storage requirements for each of the two chrominance components are one fourth that of luminance. For a single 1920×540 pixel field, each chrominance component has a resolution of 960×270. For a single 1280×720 frame, each chrominance component has a resolution of 640×360. The I-P and P-I interpolation ratios remain as shown in FIG. 4. Therefore, the circuits shown in FIGS. 1, 2, and 3 are duplicated for each chrominance component, with the exception that each line memory used for chrominance processing need only be able to store 640 chrominance samples. The chrominance processing bandwidth for each component is one fourth the luminance bandwidth shown in Table 1.

In general, this invention may be used for any horizontal and vertical multi-tap filter application including, but not limited to, the following: I-P and P-I conversion for formats other than those previously mentioned, such as a) standard definition, e.g., 1) NTSC, 2) PAL, 3) SECAM, 4) etc.; b) scaling video to fit within a window; c) low pass or high pass spatial filters; d) the I-P technique of "nearest neighbor", according to which the closest pixel vertically from the input field is copied to the output frame; and e) simple pass through mode in cases where scan conversion is not required. Additionally, in accordance with an aspect of the invention, the configurable horizontal and vertical filters can be designed to simultaneously implement other filtering operations as well, such as 1) edge enhancement, 2) noise reduction, 3) chrominance interpolation, 4) and picture reduction (for picture-in-picture (PIP)), by combining such filters according to well known techniques.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. Apparatus for use in converting an interlace image field to a progressive image field and vice versa, the apparatus comprising:
   a vertical filter;
   a separate horizontal filter; and
   means for routing an input signal first to said vertical filter and the output therefrom to said horizontal filter when said input signal is to be converted from interlace to progressive and for routing said input signal first to said horizontal filter and the output therefrom to said vertical filter when said input signal is to be converted from progressive to interlace, without using an interlacer or linear interpolator before said vertical and horizontal filters.

2. The invention as defined in claim 1 further comprising means for selecting as the output of said apparatus the output of said horizontal filter when said input signal is to be converted from interlace to progressive and for selecting as the output of said apparatus the output of said vertical filter when said input signal is to be converted from progressive to interlace.

3. The invention as defined in claim 1 wherein said interlace image field has a resolution of 1920×540 pixels and said progressive image field has a resolution of 1280×720 pixels.

4. The invention as defined in claim 1 wherein said image field is one of a sequence of image fields that make up a video signal and wherein conversion from said interlace image field to said progressive image or vice versa is performed on a per-field basis.

5. The invention as defined in claim 1 further including means for determining whether to or not to perform conversion from said interlace image field to said progressive image field.

6. The invention as defined in claim 1 further including means for determining whether to or not to perform conversion from said image progressive field to said interlace image field.

7. The invention as defined in claim 1 wherein said horizontal filter is a polyphase filter.

8. The invention as defined in claim 1 wherein said vertical filter is a polyphase filter.

9. The invention as defined in claim 1 wherein said horizontal filter is configurable and wherein said horizontal filter is configured as a function of whether said input signal is to be converted from interlace to progressive or from progressive to interlace.

10. The invention as defined in claim 1 wherein said vertical filter is configurable and wherein said vertical filter is configured as a function of whether said input signal is to be converted from interlace to progressive or from progressive to interlace.

11. The invention as defined in claim 1 wherein said vertical filter comprises a plurality of line memories, and wherein the length of each of said line memories is not greater than the number of pixels in a line of a field for conversion that has the greatest horizontal resolution.

12. The invention as defined in claim 1 wherein said vertical filter comprises a plurality of line memories, and wherein the length of each of said line memories is not greater than the number of samples in a line of a field for conversion that has the greatest horizontal resolution.

13. The invention as defined in claim 1 wherein said means for routing comprises a plurality of multiplexers.

14. The invention as defined in claim 13 wherein each of said multiplexers has an input connected to said input signal.

15. The invention as defined in claim 13 wherein an output of a first of said multiplexers is connected to said vertical filter and an output of a second of said multiplexers is connected to said horizontal filter.

16. Apparatus for horizontal and vertical multi-tap filtering, comprising:

a vertical filter;

a separate horizontal filter; and a plurality of multiplexers arranged to route an input signal first to said vertical filter and the output therefrom to said horizontal filter when said input signal is to be horizontally decimated to a lower resolution and vertically interpolated to a higher resolution and for routing said input signal first to said horizontal filter and the output therefrom to said vertical filter when said input signal is to be horizontally interpolated to a higher resolution and vertically decimated to a lower resolution, without using an interlacer or linear interpolator before said vertical and horizontal filters.

17. The invention as defined in claim 16 further comprising an additional multiplexer selecting as the output of said apparatus the output of said horizontal filter when said input signal is to horizontally decimated to a lower resolution and vertically interpolated to a higher and for selecting as the output of said apparatus the output of said vertical filter when said input signal is to be horizontally interpolated to a higher resolution and vertically decimated to a lower resolution.

18. The invention as defined in claim 16 wherein said vertical filter comprises a plurality of line memories, and wherein the length of each of said line memories is not greater than the number of pixels in a line of a field for conversion that has the greatest horizontal resolution.

19. The invention as defined in claim 16 wherein said vertical filter comprises a plurality of line memories, and wherein the length of each of said line memories is not greater than the number of samples in a line of a field for conversion that has the greatest horizontal resolution.

20. The invention as defined in claim 16 wherein said vertical filter and said horizontal filter are configurable polyphase filters.

21. Apparatus for horizontal and vertical multi-tap filtering, comprising:

a vertical filter including (i) a plurality of line memories, (ii) a first coefficient store, (iii) a plurality of first multipliers, and (iv) a first adder having a plurality of inputs, each of said first multipliers being arranged to multiply an output of a respective one of said line memories by a coefficient stored in said first coefficient store, the resulting products being coupled to said first adder for summation thereby;

a separate horizontal filter including (i) a plurality of single element storage units, (ii) a second coefficient store, (iii) a plurality of second multipliers, and (iv) a second adder having a plurality of inputs, each of said second multipliers being arranged to multiply an output of a respective one of said single element storage units by a coefficient stored in said second coefficient store, the resulting products being coupled to said second adder for summation thereby; and a plurality of multiplexers arranged to route an input signal first to said vertical filter and the output therefrom to said horizontal filter when said input signal is to be horizontally decimated to a lower resolution and vertically interpolated to a higher resolution and for routing said input signal first to said horizontal filter and the output therefrom to said vertical filter when said input signal is to be horizontally interpolated to a higher resolution and vertically decimated to a lower resolution, without using an interlacer or linear interpolation before said vertical and horizontal filters.

22. The invention as defined in claim 21 wherein the length of each of said line memories is not greater than the number of pixels in a line of a field for conversion that has the greatest horizontal resolution.

23. The invention as defined in claim 21 wherein the length of each of said line memories is not greater than the number of samples in a line of a field for conversion that has the greatest horizontal resolution.

24. Apparatus for horizontal and vertical multi-tap filtering an input signal, comprising:

means for vertical filtering;

separate means for horizontal filtering; and means for routing said input signal first to said means for vertical filtering and the output therefrom to said means for horizontal filtering when said input signal is to be horizontally decimated to a lower resolution and vertically interpolated to a higher resolution and for routing said input signal first to said means for horizontal filtering and the output therefrom to said means for vertical filtering when said input signal is to be horizontally interpolated to a higher resolution and vertically decimated to a lower resolution, without using an interlacer or linear interpolatior before said vertical and horizontal filters.

* * * * *